United States Patent
Yu et al.

(10) Patent No.: US 9,836,843 B2
(45) Date of Patent: Dec. 5, 2017

(54) METHOD FOR ASSESSING OBJECTIVE QUALITY OF STEREOSCOPIC VIDEO BASED ON REDUCED TIME-DOMAIN WEIGHTING

(71) Applicant: Ningbo University, Ningbo, Zhejiang (CN)

(72) Inventors: Mei Yu, Zhejiang (CN); Kaihui Zheng, Zhejiang (CN); Gangyi Jiang, Zhejiang (CN); Yang Song, Zhejiang (CN); Shanshan Liu, Zhejiang (CN)

(73) Assignee: Ningbo University, Ningbo, Zhejiang (CN)

( * ) Notice: Subject to any disclaimer, the term of this patent is extended or adjusted under 35 U.S.C. 154(b) by 232 days.

(21) Appl. No.: 14/949,045

(22) Filed: Nov. 23, 2015

(65) Prior Publication Data
US 2016/0301909 A1 Oct. 13, 2016

(30) Foreign Application Priority Data

Apr. 8, 2015 (CN) .......................... 2015 1 0161665

(51) Int. Cl.
*G06T 7/00* (2017.01)
*H04N 17/00* (2006.01)
(Continued)

(52) U.S. Cl.
CPC .......... *G06T 7/0022* (2013.01); *G06T 7/0002* (2013.01); *H04N 17/00* (2013.01);
(Continued)

(58) Field of Classification Search
CPC ........................... H04N 19/597; G06T 7/0022
See application file for complete search history.

(56) References Cited

PUBLICATIONS

Gokce Nur; Hemantha Kodikara Arachchi; Safak Dogan; Ahmet M. Kondoz, Modeling user perception of 3D video based on ambient illumination context for enhanced user centric media access and consumption, Published online: Jun. 3, 2011, Springer Science+Business Media, LLC 2011.*

(Continued)

*Primary Examiner* — Jamie Atala
*Assistant Examiner* — Hesham Abouzahra (57) ABSTRACT

A method for assessing an objective quality of a stereoscopic video based on reduced time-domain weighting, which considers a time domain perception redundant characteristic of human eyes during a video perception, includes steps of: through a motion intensity mean value and a motion intensity variance of an undistorted stereoscopic video and the motion intensity mean value and the motion intensity variance of each frame group, determining a motion intensity level of each frame group of the undistorted stereoscopic video; for the frame groups having different motion intensity levels, selecting undistorted reduced stereoscopic images through different frame extracting strategies with different densities; measuring a quality of a simultaneous distorted reduced stereoscopic image relative to the undistorted reduced stereoscopic image; through weighting each quality of the simultaneous distorted reduced stereoscopic image relative to the undistorted reduced stereoscopic image, obtaining a quality of a distorted stereoscopic video relative to the undistorted stereoscopic video.

8 Claims, 1 Drawing Sheet

(51) Int. Cl.
H04N 13/00 (2006.01)
H04N 19/597 (2014.01)
(52) U.S. Cl.
CPC ............... G06T 2207/10021 (2013.01); G06T 2207/30168 (2013.01); H04N 19/597 (2014.11); H04N 2013/0085 (2013.01)

(56) References Cited

PUBLICATIONS

Chunting Yang; Yang Liu; and Jing Yu, Research on Video Sequences Quality Based on Motion Intensity, Online: Jan. 12, 2010, Faculty of Information and Electronic Engineering, Zhejiang University of Science and Technology, Hangzhou, China.*

Mashhour Solh and Ghassan AlRegib, MIQM: A Novel Multi-View Images Quality Measure, School of Electrical and Computer Engineering: Georgia Institute of Technology.*

* cited by examiner

METHOD FOR ASSESSING OBJECTIVE QUALITY OF STEREOSCOPIC VIDEO BASED ON REDUCED TIME-DOMAIN WEIGHTING

CROSS REFERENCE OF RELATED APPLICATION

The present invention claims priority under 35 U.S.C. 119(a-d) to CN 201510161665.5, filed Apr. 8, 2015.

BACKGROUND OF THE PRESENT INVENTION

Field of Invention

The present invention relates to a video quality assessment method, and more particularly to a method for assessing an objective quality of a stereoscopic video based on reduced time-domain weighting.

Description of Related Arts

The three-dimensional image and stereoscopic video technology develops rapidly in the current image and video processing field. The applications of the related technologies have greatly integrated into the current social life, such as the stereoscopic television, the stereoscopic film and the naked-eye 3D. Multiple colleges and scientific research institutions around the world research on the objective quality assessment of the stereoscopic images and have achieved the great success in the field of the objective quality assessment of the stereoscopic images, while the colleges and the scientific research institutions research relatively less in the field of the objective quality assessment of the stereoscopic videos.

The conventional method for assessing the objective quality of the stereoscopic video assesses the stereoscopic video mainly with reference to the method for assessing the objective quality of the stereoscopic images. The conventional method considers less about the perception characteristic of the stereoscopic video in the time domain, merely processes the quality of each frame in the time domain with the average weighting, overlooks the influence on the quality of the stereoscopic video by the different characteristic differences of each frame (such as the brightness and the motion), and ignores the importance of the time-domain weighting. Thus, the correlation between the objective assessment result and the subjective perception of the stereoscopic video is poor. Moreover, most of the conventional methods for assessing the objective quality of the stereoscopic video are full-reference typed, such as the quality assessment method based on the peak signal-to-noise ratio (PSNR), which requires comparing the difference between the distorted viewpoint and the original viewpoint one pixel by one pixel. Thus, when assessing the quality of the video, the entire original video information is necessary for the full-reference method. The full-reference method requires the entire original video information to compare, while it is often impossible to obtain the original video information in the practical application. The reduced-reference method extracts the effective features from the original video for comparing. Compared with the original video, the required information of the reduced-reference method has a much smaller amount of information. Thus, compared with the full-reference method, the reduced-reference method is more practical.

SUMMARY OF THE PRESENT INVENTION

An object of the present invention is to provide a method for assessing an objective quality of a stereoscopic video based on reduced time-domain weighting, which is able to effectively increase a correlation between an objective assessment result and a subjective perception.

Technical solutions of the present invention are described as follows.

A method for assessing an objective quality of a stereoscopic video based on reduced time-domain weighting comprises steps of:

① denoting an original undistorted stereoscopic video by $V_{org}$; denoting an n th frame of a stereoscopic image of the original undistorted stereoscopic video $V_{org}$ as $I_{org}^n$; denoting a left viewpoint image and a right viewpoint image of the stereoscopic image $I_{org}^n$ respectively as $I_{org,l}^n$ and $I_{org,r}^n$; and denoting a distorted stereoscopic video to be assessed by $V_{dis}$, $V_{dis}$ is a distorted $V_{org}$; wherein: $1 \leq n \leq f_{num}$, and $f_{num}$ denotes a total frame number of the stereoscopic images respectively of the $V_{org}$ and the $V_{dis}$;

② calculating a motion intensity of the left viewpoint image of each frame of the undistorted stereoscopic video $V_{org}$ and denoting the motion intensity of the $I_{org,l}^n$ as $IE_{org,l}^n$, wherein the $$IE_{org,l}^n = \begin{cases} 0, & \text{if } n = 1 \\ \dfrac{\sum\limits_{x=1}^{M}\sum\limits_{y=1}^{N} E_{org,l}^n(x, y)}{M \times N}, & \text{if } 2 \leq n \leq f_{num} \end{cases} ;$$

calculating the motion intensity of the right viewpoint image of each frame of the undistorted stereoscopic video $V_{org}$ and denoting the motion intensity of the $I_{org,r}^n$ as $IE_{org,r}^n$, wherein the $$IE_{org,r}^n = \begin{cases} 0, & \text{if } n = 1 \\ \dfrac{\sum\limits_{x=1}^{M}\sum\limits_{y=1}^{N} E_{org,r}^n(x, y)}{M \times N}, & \text{if } 2 \leq n \leq f_{num} \end{cases} ;$$

calculating the motion intensity of each frame of the undistorted stereoscopic video $V_{org}$ and denoting the motion intensity of the $I_{org}^n$ as $IE_{org}^n$, wherein the $$IE_{org}^n = \frac{IE_{org,l}^n + IE_{org,r}^n}{2};$$

wherein:

the M denotes a width of the stereoscopic image respectively of the $V_{org}$ and the $V_{dis}$; the N denotes a height of the stereoscopic image respectively of the $V_{org}$ and the $V_{dis}$; $1 \leq x \leq M$; $1 \leq y \leq N$; the $E_{org,l}^n(x, y)$ denotes the motion intensity of a first pixel having a coordinate position of (x,y) in the $I_{org,l}^n$, and the $E_{org,l}^n(x,y) = \sqrt{(\Delta x_{org,l}^n)^2 + (\Delta y_{org,l}^n)^2}$; the $\Delta x_{org,l}^n$ and the $\Delta y_{org,l}^n$ respectively denote a horizontal component and a vertical component of a motion vector of the first pixel having the coordinate position of (x,y) in the $I_{org,l}^n$; the $E_{org,r}^n(x,y)$ denotes the motion intensity of a second pixel having the coordinate position of (x, y) in the $I_{org,r}^n$, and the $E_{org,r}^n(x,y) = \sqrt{(\Delta x_{org,r}^n)^2 + (\Delta y_{org,r}^n)^2}$; the $\Delta x_{org,r}^n$ and $\Delta y_{org,r}^n$ respectively denote the horizontal component and the vertical component of the motion vector of the second pixel having the coordinate position of (x, y) in the $I_{org,r}^n$;

③ calculating a motion intensity mean value and a motion intensity variance of the $V_{org}$, respectively denoted as $E_{org,mean}$ and $E_{org,var}$, wherein the $$E_{org,mean} = \frac{\sum_{n=1}^{f_{num}} IE_{org}^n}{f_{num}} \text{ and the } E_{org,var} = \frac{\sum_{n=1}^{f_{num}} (IE_{org}^n - E_{org,mean})^2}{f_{num}};$$

④ adopting continuous g frames of the undistorted stereoscopic video $V_{org}$, from a first frame of the undistorted stereoscopic video $V_{org}$, as a frame group; dividing the $V_{org}$ into $$\left\lfloor \frac{f_{num}}{g} \right\rfloor$$

frame groups; and denoting an n' th frame group of the $V_{org}$ as $G_{org}^{n'}$; wherein: $g=2^p$; $p=3$ or 4 or 5; $\lfloor \ \rfloor$ is a round-down symbol; and $$1 \leq n' \leq \left\lfloor \frac{f_{num}}{g} \right\rfloor;$$

⑤ calculating the motion intensity mean value and the motion intensity variance of each frame group of the $V_{org}$; denoting the motion intensity mean value and the motion intensity variance of the $G_{org}^{n'}$ respectively as $E_{org,mean}^{n'}$ and $E_{org,var}^{n'}$, wherein the $$E_{org,mean}^{n'} = \frac{\sum_{n=n' \times g - g + 1}^{n' \times g} IE_{org}^n}{g} \text{ and the}$$

$$E_{org,var}^{n'} = \frac{\sum_{n=n' \times g - g + 1}^{n' \times g} (IE_{org}^n - E_{org,mean})^2}{g};$$

⑥ determining a motion intensity level of each frame group of the $V_{org}$; denoting the motion intensity level of the $G_{org}^{n'}$ as $T_{org}^{n'}$, wherein the $$T_{org}^{n'} = \begin{cases} \text{level 2} & \text{if } E_{org,mean}^{n'} > E_{org,mean} \text{ and } E_{org,var}^{n'} > E_{org,var} \\ \text{level 0} & \text{if } E_{org,mean}^{n'} < E_{org,mean} \text{ and } E_{org,var}^{n'} < E_{org,var}; \\ \text{level 1} & \text{others} \end{cases}$$

the $T_{org}^{n'}$=level 0 denotes that the motion intensity of the $G_{org}^{n'}$ is the lowest; the $T_{org}^{n'}$=level 1 denotes that the motion intensity of the $G_{org}^{n'}$ is medium; and the $T_{org}^{n'}$=level 2 denotes that the motion intensity of the $G_{org}^{n'}$ is the highest;

⑦ according to the motion intensity level of each frame group of the $V_{org}$, selecting different numbers of the stereoscopic images from each frame group of the $V_{org}$ as undistorted reduced stereoscopic images of the $V_{org}$; $G_{org}^{n'}$, if the $T_{org}^{n'}$=level 0 or the $T_{org}^{n'}$=level 2, arbitrarily selecting one frame of the stereoscopic image from the $G_{org}^{n'}$ as the undistorted reduced stereoscopic image; if the $T_{org}^{n'}$=level 1, adopting continuous $$\frac{g}{2^q}$$

frames of the stereoscopic images of the $G_{org}^{n'}$ as a sub frame group, dividing the $G_{org}^{n'}$ into $2^q$ sub frame groups, arbitrarily selecting one frame of the stereoscopic image from each sub frame group of the $G_{org}^{n'}$ as the undistorted reduced stereoscopic image and obtaining totally $2^q$ frames of the undistorted reduced stereoscopic images from the $G_{org}^{n'}$, wherein q=0 or 1 or 2;

⑧ supposing that the frame number of the undistorted reduced stereoscopic images of the $V_{org}$ is totally $f_{num}'$, adopting each frame of the stereoscopic image of the $V_{dis}$ which is simultaneous with the frame of the undistorted reduced stereoscopic image, as a frame of a distorted reduced stereoscopic image of the $V_{dis}$ and obtaining totally $f_{num}'$ frames of the distorted reduced stereoscopic images of the $V_{dis}$; denoting an m th frame of the undistorted reduced stereoscopic image of the $V_{org}$ as $F_{org}^m$ and denoting an m th frame of the distorted reduced stereoscopic image of the $V_{dis}$ as $F_{dis}^m$, wherein $1 \leq m \leq f_{num}'$;

⑨ calculating a quality of each frame of the distorted reduced stereoscopic image of the $V_{dis}$ relative to the simultaneous frame of the undistorted reduced stereoscopic image of the $V_{org}$ and denoting the quality of the $F_{dis}^m$ relative to the $F_{org}^m$ as $Q^m$; and ⑩ calculating a quality of the $v_{dis}$ relative to the $V_{org}$ and denoting the quality of the $V_{dis}$ relative to the $V_{org}$ as Q, wherein the $$Q = \frac{\sum_{m=1}^{f_{num}'} (Q^m \times FE_{org}^m)}{\sum_{m=1}^{f_{num}'} FE_{org}^m}$$

and the $FE_{org}^m$ denotes the motion intensity of the $F_{org}^m$.

Preferably, in the step ④, p=4; and, in the step ⑦, q=2.

Preferably, in the step ⑨, calculating the quality $Q^m$ of the $F_{dis}^m$ relative to the $F_{org}^m$ comprises steps of:

⑨-1, denoting the left viewpoint image and the right viewpoint image of the $F_{dis}^m$ respectively as $F_{dis,l}^m$ and $F_{dis,r}^m$;

⑨-2, obtaining respective qualities of the $F_{dis,l}^m$ and the $F_{dis,r}^m$ through a peak signal-to-noise ratio image quality assessment method, respectively denoted as $Q_{PSNR,l}^m$ and $Q_{PSNR,r}^m$; and ⑨-3, calculating the quality of the $F_{dis}^m$ relative to the $F_{org}^m$, denoted as the $Q^m$, wherein the $$Q^m = \frac{Q_{PSNR,l}^m + Q_{PSNR,r}^m}{2}.$$

Preferably, in the step ⑨, calculating the quality $Q^m$ of the $F_{dis}^m$ relative to the $F_{org}^m$ comprises steps of:

⑨-1), denoting the left viewpoint image and the right viewpoint image of the $F_{dis}^m$ respectively as the $F_{dis,l}^m$ and the $F_{dis,r}^m$;

⑨-2), obtaining respective qualities of the $F_{dis,l}^m$ and the $F_{dis,r}^m$ through a structural similarity image quality assessment method, respectively denoted as $Q_{SSIM,l}^m$ and $Q_{SSIM,r}^m$; and ⑨-3), calculating the quality of the $F_{dis}{}^m$ relative to the $F_{org}{}^m$, denoted as the $Q^m$, wherein the $$Q^m = \frac{Q^m_{SSIM,l} + Q^m_{SSIM,r}}{2}.$$

Preferably, in the step ⑨, calculating the quality $Q^m$ of the $F_{dis}{}^m$ relative to the $F_{org}{}^m$ comprises steps of: obtaining the quality of the $F_{dis}{}^m$ to the $F_{org}{}^m$ through an objective assessment method of a reduced reference stereoscopic image quality based on a human visual perception, and denoting the quality of the $F_{dis}{}^m$ relative to the $F_{org}{}^m$ as the $Q^m$.

Compared with the conventional technologies, the present invention considers a perception characteristic of human eyes to a time domain motion and analyzes a motion characteristic of the stereoscopic video. According to video clips having different motion intensity levels, different strategies are chosen to select reduced frames for a subsequent quality assessment, in such a manner that the present invention conforms to a time domain perception characteristic of the human eyes to the stereoscopic video and well reflects an importance of the video clips in the entire stereoscopic video. Moreover, through extracting the reduced frames, the present invention effectively reduces redundant information of the stereoscopic video and increases a practical application ability. In a final video quality calculation, the present invention weights the reduced frames through the motion intensity levels in the time domain to obtain a final quality of the stereoscopic video, in such a manner that a calculation result well conforms to a time domain perception of the human eyes and a correlation between an objective assessment result and a subjective perception is effectively increased.

These and other objectives, features, and advantages of the present invention will become apparent from the following detailed description, the accompanying drawings, and the appended claims.

DETAILED DESCRIPTION OF THE PREFERRED EMBODIMENT

The present invention is further illustrated with accompanying drawings and a preferred embodiment of the present invention.

The present invention provides a method for assessing an objective quality of a stereoscopic video based on reduced time-domain weighting, which takes a time domain to perception redundant characteristic of human eyes during a video perception into consideration, comprising steps of: through a motion intensity mean value and a motion intensity variance of an undistorted stereoscopic video and the motion intensity mean value and the motion intensity variance of each frame group of the undistorted stereoscopic video, determining a motion intensity level of each frame group of the undistorted stereoscopic video; for the frame groups having different motion intensity levels, selecting undistorted reduced stereoscopic images through different frame extracting strategies with different densities; measuring a quality of a simultaneous distorted reduced stereoscopic image relative to the undistorted reduced stereoscopic image; by weighting each quality of the simultaneous distorted reduced stereoscopic image relative to the undistorted reduced stereoscopic image, obtaining a quality of a distorted stereoscopic video relative to the undistorted stereoscopic video.

Figure 1:
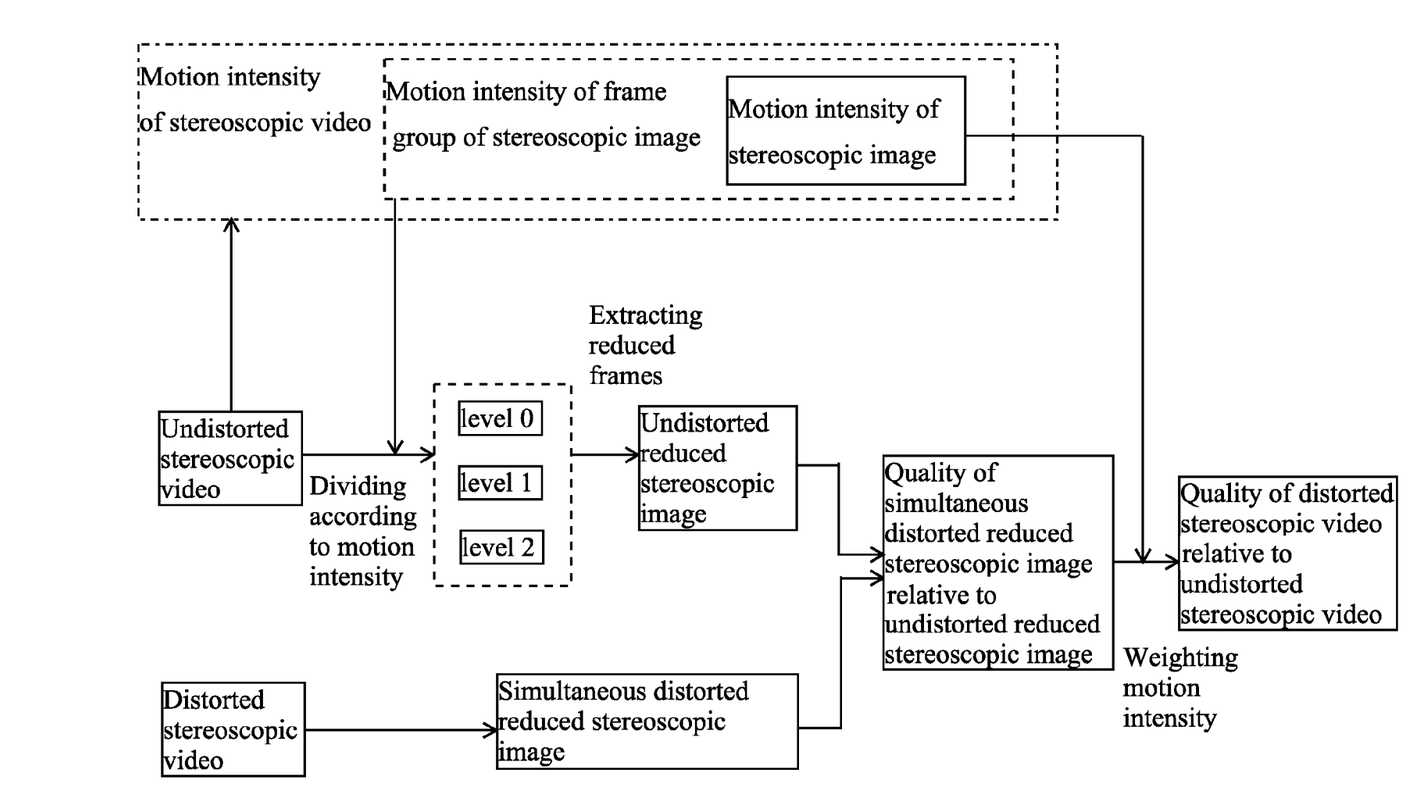
The FIGURE is an implementation block diagram of a method for assessing an objective quality of a stereoscopic video based on reduced time-domain weighting according to a preferred embodiment of the present invention.

An implementation block diagram of the method for assessing the objective quality of the stereoscopic video based on the reduced time-domain weighting, as shown in figure, comprises steps of:

① denoting an original undistorted stereoscopic video by $V_{org}$; denoting an n th frame of a stereoscopic image of the original undistorted stereoscopic video $V_{org}$ as $I_{org}{}^n$; denoting a left viewpoint image and a right viewpoint image of the stereoscopic image $I_{org}{}^n$ respectively as $I_{org,l}{}^n$ and $I_{org,r}{}^n$; denoting a distorted stereoscopic video to be assessed by $V_{dis}$, $V_{dis}$ is a distorted $V_{org}$; denoting an n th frame of the distorted stereoscopic video $V_{dis}$ as $I_{dis}{}^n$; denoting a left viewpoint image and a right viewpoint image of the $I_{dis}{}^n$ respectively as $I_{dis,l}{}^n$ and $I_{dis,r}{}^n$; wherein: $1 \leq n \leq f_{num}$; and $f_{num}$ denotes a total frame number of the stereoscopic images respectively of the $V_{org}$ and the $V_{dis}$;

② calculating a motion intensity of the left viewpoint image of each frame of the undistorted stereoscopic video $V_{org}$ and denoting the motion intensity of the $I_{org,l}{}^n$ as $IE_{org,l}{}^n$, wherein the $$IE^n_{org,l} = \begin{cases} 0, & \text{if } n = 1 \\ \dfrac{\sum_{x=1}^{M} \sum_{y=1}^{N} E^n_{org,l}(x, y)}{M \times N}, & \text{if } 2 \leq n \leq f_{num} \end{cases} ;$$

calculating the motion intensity of the right viewpoint image of each frame of the undistorted stereoscopic video $V_{org}$ and denoting the motion intensity of the $I_{org,r}{}^n$ as $IE_{org,r}{}^n$, wherein the $$IE^n_{org,r} = \begin{cases} 0, & \text{if } n = 1 \\ \dfrac{\sum_{x=1}^{M} \sum_{y=1}^{N} E^n_{org,r}(x, y)}{M \times N}, & \text{if } 2 \leq n \leq f_{num} \end{cases} ;$$

calculating the motion intensity of each frame of the undistorted stereoscopic video $V_{org}$ and denoting the motion intensity of the $I_{org}{}^n$ as $IE_{org}{}^n$, wherein the $$IE^n_{org} = \frac{IE^n_{org,l} + IE^n_{org,r}}{2};$$

wherein:

the M denotes a width of the stereoscopic image respectively of the $V_{org}$ and the $V_{dis}$; the N denotes a height of the stereoscopic image respectively of the $V_{org}$ and the $V_{dis}$; $1 \leq x \leq M$; $1 \leq y \leq N$; the $E_{org,l}{}^n(x, y)$ denotes the motion intensity of a first pixel having a coordinate position of (x,y) in the $I_{org,l}{}^n$, and the $E_{org,l}{}^n(x,y) = \sqrt{(\Delta x_{org,l}{}^n)^2 + (\Delta y_{org,l}{}^n)^2}$; the $\Delta x_{org,l}{}^n$ and the $\Delta y_{org,l}{}^n$ respectively denote a horizontal component and a vertical component of a motion vector of the first pixel having the coordinate position of (x,y) in the $I_{org}^n$; the $E_{org,r}^n(x,y)$ denotes the motion intensity of a second pixel having the coordinate position of (x, y) in the $I_{org,r}^n$, and the $E_{org,r}^n(x,y)=\sqrt{(\Delta x_{org,r}^n)^2+(\Delta y_{org,r}^n)^2}$; the $\Delta x_{org,r}^n$ and the $\Delta y_{org,r}^n$ respectively denote the horizontal component and the vertical component of the motion vector of the second pixel having the coordinate position in (x, y) of the $I_{org,r}^n$; according to the preferred embodiment of the present invention, the motion vector of the first pixel having the coordinate position of (x, y) in the $I_{org,l}^n$ and the motion vector of the second pixel having the coordinate position of (x,y) in the $I_{org,r}^n$, are obtained through conventional technologies;

③ calculating a motion intensity mean value and a motion intensity variance of the $V_{org}$, respectively denoted as $E_{org,mean}$ and $E_{org,var}$, wherein the $$E_{org,mean} = \frac{\sum_{n=1}^{f_{num}} IE_{org}^n}{f_{num}} \text{ and the } E_{org,var} = \frac{\sum_{n=1}^{f_{num}} (IE_{org}^n - E_{org,mean})^2}{f_{num}};$$

④ adopting continuous g frames of the undistorted stereoscopic video $V_{org}$, from a first frame of the undistorted stereoscopic video $\overline{V}_{org}$, as a frame group; dividing the $V_{org}$ into $$\left\lfloor \frac{f_{num}}{g} \right\rfloor$$

frame groups; denoting an n'th frame group of the $V_{org}$ as $G_{org}^{n'}$; adopting the continuous g frames of the distorted stereoscopic video $V_{dis}$, from a first frame of the distorted stereoscopic video $\overline{V}_{dis}$, as a frame group; dividing the $V_{dis}$ into $$\left\lfloor \frac{f_{num}}{g} \right\rfloor$$

frame groups; and denoting an n'th frame group of the $V_{dis}$ as $G_{dis}^{n'}$; wherein: $g=2^p$; $p=3$ or 4 or 5, wherein it is embodied that $p=4$ herein; $\lfloor \ \rfloor$ is a round-down symbol;

$$1 \le n' \le \left\lfloor \frac{f_{num}}{g} \right\rfloor;$$

and all the redundant stereoscopic images of the $V_{org}$ and the $V_{dis}$, which are unable to constitute the group frame, are abandoned without processing;

⑤ calculating the motion intensity mean value and the motion intensity variance of each frame group of the $V_{org}$; denoting the motion intensity mean value and the motion intensity variance of the $G_{org}^{n'}$ respectively as $E_{org,mean}^{n'}$ and $E_{org,var}^{n'}$, wherein the $$E_{org,mean}^{n'} = \frac{\sum_{n=n'\times g-g+1}^{n'\times g} IE_{org}^n}{g} \text{ and the }$$

$$E_{org,var}^{n'} = \frac{\sum_{n=n'\times g-g+1}^{n'\times g} (IE_{org}^n - IE_{org,mean})^2}{g};$$

⑥ determining a motion intensity level of each frame group of the $V_{org}$; denoting the motion intensity level of the $G_{org}^{n'}$ as $T_{org}^{n'}$, wherein the $$T_{org}^{n'} = \begin{cases} \text{level 2} & \text{if } E_{org,mean}^{n'} > E_{org,mean} \text{ and } E_{org,var}^{n'} > E_{org,var} \\ \text{level 0} & \text{if } E_{org,mean}^{n'} < E_{org,mean} \text{ and } E_{org,var}^{n'} < E_{org,var} \\ \text{level 1} & \text{others} \end{cases};$$

the $T_{org}^{n'}$=level 0 denotes that the motion intensity of the $G_{org}^{n'}$ is the lowest; the $T_{org}^{n'}$=level 1 denotes that the motion intensity of the $G_{org}^{n'}$ is medium; and the $T_{org}^{n'}$=level 2 denotes that the motion intensity of the $G_{org}^{n'}$ is the highest;

⑦ according to the motion intensity level of each frame group of the $V_{org}$, selecting different numbers of the stereoscopic images from each frame group of the $V_{org}$ as undistorted reduced stereoscopic images of the $V_{org}$; for the $G_{org}^{n'}$, if the $T_{org}^{n'}$=level 0 or the $T_{org}^{n'}$=level 2, arbitrarily selecting one frame of the stereoscopic image from the $G_{org}^{n'}$ as the undistorted reduced stereoscopic image; if the $T_{org}^{n'}$=level 1, adopting continuous $$\frac{g}{2^q}$$

frames of the stereoscopic images of the $G_{org}^{n'}$ as a sub frame group, dividing the $G_{org}^{n'}$ into $2^q$ sub frame groups, arbitrarily selecting one frame of the stereoscopic image from each sub frame group of the $G_{org}^{n'}$ as the undistorted reduced stereoscopic image and obtaining totally $2^q$ frames of the undistorted reduced stereoscopic images from the $G_{org}^{n'}$, wherein: q=0 or 1 or 2; it is embodied that q=2 herein;

⑧ supposing that the frame number of the undistorted reduced stereoscopic images of the $V_{org}$ is totally $f_{num}'$, adopting each frame of the stereoscopic image of the $V_{dis}$ which is simultaneous with the frame of the undistorted reduced stereoscopic image, as a frame of a distorted reduced stereoscopic image of the $V_{dis}$ and obtaining totally $f_{num}'$ frames of the distorted reduced stereoscopic images of the $V_{dis}$; denoting an m th frame of the undistorted reduced stereoscopic image of the $V_{org}$ as $F_{org}^m$ and denoting an m th frame of the distorted reduced stereoscopic image of the $V_{dis}$ as $F_{dis}^m$, wherein: $1 < f_{num}' < f_{num}$ and $1 \le m \le f_{num}'$;

⑨ calculating a quality of each frame of the distorted reduced stereoscopic image of the $V_{dis}$ relative to the simultaneous frame of the undistorted reduced stereoscopic image of the $V_{org}$ and denoting the quality of the $F_{dis}^m$ relative to the $F_{org}^m$ as $Q^m$; wherein:

in the preferred embodiment of the present invention, the quality $Q^m$ of the $F_{dis}^m$ relative to the $F_{org}^m$ is obtained through conventional image quality assessment methods; the conventional image quality assessment methods comprises a peak signal-to-noise ratio (PSNR) image quality assessment method, a structural similarity (SSIM) image quality assessment method and an objective assessment method of a reduced reference stereoscopic image quality based on a human visual perception, and any of the methods above is optional;

calculating the quality $Q^m$ through the conventional PSNR image quality assessment method comprises steps of: ⑨-1, denoting the left viewpoint image and the right viewpoint image of the $F_{dis}^m$ is respectively as $F_{dis,l}^m$ and $F_{dis,r}^m$; ⑨-2, obtaining respective qualities of the $F_{dis,l}^m$ and the $F_{dis,r}^m$ through the conventional PSNR image quality assessment method, respectively denoted as $Q_{PSNR,l}^m$ and $Q_{PSNR,r}^m$; and ⑨-3, calculating the quality of the $F_{dis}^m$ relative to the $F_{org}^m$, denoted as the $Q^m$, wherein the $$Q^m = \frac{Q_{PSNR,l}^m + Q_{PSNR,r}^m}{2};$$

calculating the quality $Q^m$ through the conventional SSIM image quality assessment method comprises steps of: ⑨-1), denoting the left viewpoint image and the right viewpoint image of the $F_{dis}^m$ respectively as the $F_{dis,l}^m$ and the $F_{dis,r}^m$; ⑨-2) obtaining the respective qualities of the $F_{dis,l}^m$ and the $F_{dis,r}^m$ through the conventional SSIM image quality assessment method, respectively denoted as $Q_{SSIM,l}^m$ and $Q_{SSIM,r}^m$; and ⑨-3), calculating the quality of the $F_{dis}^m$ relative to the $F_{org}^m$, denoted as the $Q^m$, wherein the $$Q^m = \frac{Q_{SSIM,l}^m + Q_{SSIM,r}^m}{2};$$

and in a practical application, a method disclosed in the Chinese patent publication CN104144339A, Objective assessment method of reduced reference stereoscopic image quality based on human visual perception, is preferred to calculate the quality $Q^m$ of the $F_{dis}^m$ relative to the $F_{org}^m$; and ⑩ calculating a quality of the $V_{dis}$ relative to the $V_{org}$ and denoting the quality of the $V_{dis}$ relative to the $V_{org}$ as Q, wherein the $$Q = \frac{\sum_{m=1}^{f'_{num}} (Q^m \times FE_{org}^m)}{\sum_{m=1}^{f'_{num}} FE_{org}^m}$$

and the $FE_{org}^m$ denotes the motion intensity of the $F_{org}^m$.

The method provided by the present invention is tested as follows to further illustrate feasibility and effectiveness of the method.

In the preferred embodiment of the present invention, a H.264 coding distorted stereoscopic video of a stereoscopic video database provided by an IRCCyN research institution of France is chosen to be tested. The stereoscopic video database comprises 10 couples of original high-definition stereoscopic videos showing different scenes, wherein the H.264 coding distorted stereoscopic video comprises 3 couples of the H.264 coding distorted stereoscopic videos with different distortion degrees, namely totally 30 couples of the distorted stereoscopic videos. According to the method provided by the present invention, the 30 couples of the distorted stereoscopic videos are calculated to obtain a quality of each couple of the distorted stereoscopic videos relative to a corresponding undistorted original high-definition stereoscopic video. Then the calculated quality is processed through a four-parameter Logistic function non-linear fitting with a difference mean opinion score (DMOS) which represents the subjective quality of the distorted stereoscopic videos. Finally, a performance index value between an objective assessment result and a subjective perception is obtained. Herein, three common objective parameters for assessing a video quality assessment method serve as assessment indexes. The three objective parameters are respectively Correlation coefficient (CC), Spearman Rank Order Correlation coefficient (SROCC) and Rooter Mean Squared Error (RMSE). A value range of the CC and the SROCC is [0, 1], wherein the nearer a value approximates to 1, the better an objective assessment method is; otherwise, the objective assessment method is worse. The smaller RMSE, the higher precision of a predication of the objective assessment method, and the better performance of the objective assessment method; otherwise, the predication of the objective assessment method is worse. The quality of each couple of the distorted stereoscopic videos relative to the corresponding undistorted original high-definition stereoscopic video is obtained respectively through the conventional PSNR image quality assessment method (PSNR method), the conventional SSIM image quality assessment method (SSIM method), a first method for obtaining the quality of the simultaneous distorted reduced stereoscopic image relative to the undistorted reduced stereoscopic image through the PSNR method (T-PSNR method) provided by the present invention, a second method for obtaining the quality of the simultaneous distorted reduced stereoscopic image relative to the undistorted reduced stereoscopic image through the SSIM method (T-SSIM method) provided by the present invention, and a third method for obtaining the quality of the simultaneous distorted reduced stereoscopic image relative to the undistorted reduced stereoscopic image through the objective assessment method of the reduced reference stereoscopic image quality based on the human visual perception (T-method method) provided by the present invention. The obtained correlation performance parameters, CC, SROCC and RMSE, between the quality of the stereoscopic video and the DMOS are listed in Table 1. According to data listed in the Table 1, the quality of the distorted reduced stereoscopic image relative to the corresponding undistorted reduced stereoscopic image, which is obtained through the method provided by the present invention, has a good correlation with the DMOS, wherein the CC of the T-PSNR method reaches 0.7906, the SROCC of the T-PSNR method reaches 0.7876, and the RMSE of the T-PSNR method is as low as 0.7087; the CC of the T-SSIM method reaches 0.8486, the SROCC of the T-SSIM method reaches 0.8047, and the RMSE of the T-SSIM method is as low as 0.6122; the CC of the T-method method reaches 0.9487, the SROCC of the T-method method reaches 0.9243, and the RMSE of the T-method method is as low as 0.3602. Compared with the conventional PSNR method and the conventional SSIM method, the objective assessment result of the method provided by the present invention is relatively consistent with a subjective perception result of human eyes, which proves the effectiveness of the method provided by the present invention.

TABLE 1

Correlation performance parameters between quality of distorted stereoscopic video relative to corresponding undistorted stereoscopic video, obtained through various methods, and difference mean opinion score

| Assessment method | Assessment index | | |
|---|---|---|---|
| | CC | SROCC | RMSE |
| PSNR method | 0.5733 | 0.5200 | 0.9483 |
| SSIM method | 0.7257 | 0.6973 | 0.8238 |
| T-PSNR method | 0.7906 | 0.7876 | 0.7087 |
| T-SSIM method | 0.8486 | 0.8047 | 0.6122 |
| T-method method | 0.9487 | 0.9243 | 0.3602 |

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method for assessing an objective quality of a stereoscopic video based on reduced time-domain weighting, comprising steps of:

① denoting an original undistorted stereoscopic video by $V_{org}$; denoting an n th frame of a stereoscopic image of the original undistorted stereoscopic video $V_{org}$ as $I_{org}^n$; denoting a left viewpoint image and a right viewpoint image of the stereoscopic image $I_{org}^n$ respectively as $I_{org,l}^n$ and $I_{org,r}^n$; and denoting a distorted stereoscopic video to be assessed by $V_{dis}$, $V_{dis}$ is a distorted $V_{org}$; wherein: $1 \le n \le f_{num}$, and $f_{num}$ denotes a total frame number of the stereoscopic images respectively of the $V_{org}$ and the $V_{dis}$;

② calculating a motion intensity of the left viewpoint image of each frame of the undistorted stereoscopic video $V_{org}$ and denoting the motion intensity of the $I_{org,l}^n$ as $IE_{org,l}^n$, wherein the $$IE_{org,l}^n = \begin{cases} 0, & \text{if } n = 1 \\ \dfrac{\sum_{x=1}^{M}\sum_{y=1}^{N} E_{org,l}^n(x, y)}{M \times N}, & \text{if } 2 \le n \le f_{num} \end{cases};$$

calculating the motion intensity of the right viewpoint image of each frame of the undistorted stereoscopic video $V_{org}$ and denoting the motion intensity of the $I_{org,r}^n$ as $IE_{org,r}^n$, wherein the $$IE_{org,r}^n = \begin{cases} 0, & \text{if } n = 1 \\ \dfrac{\sum_{x=1}^{M}\sum_{y=1}^{N} E_{org,r}^n(x, y)}{M \times N} & \text{if } 2 \le n \le f_{num} \end{cases};$$

calculating the motion intensity of each frame of the undistorted stereoscopic video $V_{org}$ and denoting the motion intensity of the $I_{org}^n$ as $IE_{org}^n$, wherein the $$IE_{org}^n = \frac{IE_{org,l}^n + IE_{org,r}^n}{2};$$

wherein:

the M denotes a width of the stereoscopic image respectively of the $V_{org}$ and the $V_{dis}$; the N denotes a height of the stereoscopic image respectively of the $V_{org}$ and the $V_{dis}$; $1 \le x \le M$; $1 \le y \le N$; the $E_{org,l}^n(x, y)$ denotes the motion intensity of a first pixel having a coordinate position of (x,y) in the $I_{org,l}^n$, and the $E_{org,l}^n(x,y) = \sqrt{(\Delta x_{org,l}^n)^2 + (\Delta y_{org,l}^n)^2}$; the $\Delta x_{org,l}^n$ and the $\Delta y_{org,l}^n$ respectively denote a horizontal component and a vertical component of a motion vector of the first pixel having the coordinate position of (x,y) in the $I_{org,l}^n$; the $E_{org,r}^n(x,y)$ denotes the motion intensity of a second pixel having the coordinate position of (x, y) in the $I_{org,r}^n$, and the $E_{org,r}^n(x,y) = \sqrt{(\Delta x_{org,r}^n)^2 + (\Delta y_{org,r}^n)^2}$; the $\Delta x_{org,r}^n$ and $\Delta y_{org,r}^n$ respectively denote the horizontal component and the vertical component of the motion vector of the second pixel having the coordinate position of (x, y) in the $I_{org,r}^n$;

③ calculating a motion intensity mean value and a motion intensity variance of the $V_{org}$, respectively denoted as $E_{org,mean}$ and $E_{org,var}$, wherein the $$E_{org,mean} = \frac{\sum_{n=1}^{f_{num}} IE_{org}^n}{f_{num}}$$

and the $$E_{org,var} = \frac{\sum_{n=1}^{f_{num}} (IE_{org}^n - E_{org,mean})^2}{f_{num}};$$

④ adopting continuous g frames of the undistorted stereoscopic video $V_{org}$, from a first frame of the undistorted stereoscopic video $V_{org}$, as a frame group; dividing the $V_{org}$ into $$\left\lfloor \frac{f_{num}}{g} \right\rfloor$$

frame groups; and denoting an n'th frame group of the $V_{org}$ as $G_{org}^{n'}$; wherein: $g=2^p$; $p=3$ or 4 or 5; $\lfloor \ \rfloor$ is a round-down symbol; and $$1 \le n' \le \left\lfloor \frac{f_{num}}{g} \right\rfloor;$$

⑤ calculating the motion intensity mean value and the motion intensity variance of each frame group of the $V_{org}$; denoting the motion intensity mean value and the motion intensity variance of the $G_{org}^{n'}$ respectively as $E_{org,mean}^{n'}$ and $E_{org,var}^{n'}$, wherein the $$E_{org,mean}^{n'} = \frac{\sum_{n=n' \times g - g + 1}^{n' \times g} IE_{org}^n}{g}$$

and the $$E_{org,var}^{n'} = \frac{\sum_{n=n' \times g - g + 1}^{n' \times g} (IE_{org}^n - E_{org,mean})^2}{g};$$

⑥ determining a motion intensity level of each frame group of the $V_{org}$; denoting the motion intensity level of the $G_{org}^{n'}$ as $T_{org}^{n'}$, wherein the $$T_{org}^{n'} = \begin{cases} \text{level 2} & \text{if } E_{org,mean}^{n'} > E_{org,mean} \text{ and } E_{org,var}^{n'} > E_{org,var} \\ \text{level 0} & \text{if } E_{org,mean}^{n'} < E_{org,mean} \text{ and } E_{org,var}^{n'} < E_{org,var} ; \\ \text{level 1} & \text{others} \end{cases}$$

the $T_{org}^{n'}$=level 0 denotes that the motion intensity of the $G_{org}^{n'}$ is the lowest; the $T_{org}^{n'}$=level 1 denotes that the motion intensity of the $G_{org}^{n'}$ is medium; and the $T_{org}^{n'}$=level 2 denotes that the motion intensity of the $G_{org}^{n'}$ is the highest;

⑦ according to the motion intensity level of each frame group of the $V_{org}$, selecting different numbers of the stereoscopic images from each frame group of the $V_{org}$ as undistorted reduced stereoscopic images of the $V_{org}$; $G_{org}^{n'}$, if the $T_{org}^{n'}$=level 0 or the $T_{org}^{n'}$=level 2, arbitrarily selecting one frame of the stereoscopic image from the $G_{org}^{n'}$ as the undistorted reduced stereoscopic image; if the $T_{org}^{n'}$=level 1, adopting continuous $$\frac{g}{2^q}$$

frames of the stereoscopic images of the $G_{org}^{n'}$ as a sub frame group, dividing the $G_{org}^{n'}$ into $2^q$ sub frame groups, arbitrarily selecting one frame of the stereoscopic image from each sub frame group of the $G_{org}^{n'}$ as the undistorted reduced stereoscopic image and obtaining totally $2^q$ frames of the undistorted reduced stereoscopic images from the $G_{org}^{n'}$, wherein q=0 or 1 or 2;

⑧ supposing that the frame number of the undistorted reduced stereoscopic images of the $V_{org}$ is totally $f_{num}'$, adopting each frame of the stereoscopic image of the $V_{dis}$ which is simultaneous with the frame of the undistorted reduced stereoscopic image, as a frame of a distorted reduced stereoscopic image of the $V_{dis}$ and obtaining totally $f_{num}'$ frames of the distorted reduced stereoscopic images of the $V_{dis}$; denoting an m th frame of the undistorted reduced stereoscopic image of the $V_{org}$ as $F_{org}^m$ and denoting an m th frame of the distorted reduced stereoscopic image of the $v_{dis}$ as $F_{dis}^m$, wherein $1 \leq m \leq f_{num}'$;

⑨ calculating a quality of each frame of the distorted reduced stereoscopic image of the $V_{dis}$ relative to the simultaneous frame of the undistorted reduced stereoscopic image of the $V_{org}$ and denoting the quality of the $F_{dis}^m$ relative to the $F_{org}^m$ as $Q^m$; and ⑩ calculating a quality of the $v_{dis}$ relative to the $V_{org}$ and denoting the quality of the $V_{dis}$ relative to the $V_{org}$ as Q, wherein the $$Q = \frac{\sum_{m=1}^{f_{num}'} (Q^m \times FE_{org}^n)}{\sum_{m=1}^{f_{num}'} FE_{org}^n}$$

and the $FE_{org}^m$ denotes the motion intensity of the $F_{org}^m$.

2. The method for assessing the objective quality of the stereoscopic video based on the reduced time-domain weighting, as recited in claim 1, wherein, in the step ④, p=4; and, in the step ⑦, q=2.

3. The method for assessing the objective quality of the stereoscopic video based on the reduced time-domain weighting, as recited in claim 1, wherein, in the step ⑨, calculating the quality $Q^m$ of the $F_{dis}^m$ relative to the $F_{org}^m$ comprises steps of:

⑨-1, denoting the left viewpoint image and the right viewpoint image of the $F_{dis}^m$ respectively as the $F_{dis,l}^m$ and the $F_{dis,r}^m$;

⑨-2, obtaining respective qualities of the $F_{dis,l}^m$ and the $F_{dis,r}^m$ through a peak signal-to-noise ratio image quality assessment method, respectively denoted as $Q_{PSNR,l}^m$ and $Q_{PSNR,r}^m$; and ⑨-3, calculating the quality of the $F_{dis}^m$ relative to the $F_{org}^m$, denoted as the $Q^m$, wherein the $$Q^m = \frac{Q_{PSNR,l}^m + Q_{PSNR,r}^m}{2}.$$

4. The method for assessing the objective quality of the stereoscopic video based on the reduced time-domain weighting, as recited in claim 2, wherein, in the step ⑨, calculating the quality $Q^m$ of the $F_{dis}^m$ relative to the $F_{org}^m$ comprises steps of:

⑨-1, denoting the left viewpoint image and the right viewpoint image of the $F_{dis}^m$ respectively as the $F_{dis,l}^m$ and the $F_{dis,r}^m$;

⑨-2, obtaining respective qualities of the $F_{dis,l}^m$ and the $F_{dis,r}^m$ through a peak signal-to-noise ratio image quality assessment method, respectively denoted as $Q_{PSNR,l}^m$ and $Q_{PSNR,r}^m$; and ⑨-3, calculating the quality of the $F_{dis}^m$ relative to the $F_{org}^m$, denoted as the $Q^m$, wherein the $$Q^m = \frac{Q_{PSNR,l}^m + Q_{PSNR,r}^m}{2}.$$

5. The method for assessing the objective quality of the stereoscopic video based on the reduced time-domain weighting, as recited in claim 1, wherein, in the step ⑨, calculating the quality $Q^m$ of the $F_{dis}^m$ relative to the $F_{org}^m$ comprises steps of:

⑨-1, denoting the left viewpoint image and the right viewpoint image of the $F_{dis}^m$ respectively as the $F_{dis,l}^m$ and the $F_{dis,r}^m$;

⑨-2, obtaining respective qualities of the $F_{dis,l}^m$ and the $F_{dis,r}^m$ through a peak signal-to-noise ratio image quality assessment method, respectively denoted as $Q_{PSNR,l}^m$ and $Q_{PSNR,r}^m$; and ⑨-3, calculating the quality of the $F_{dis}^m$ relative to the $F_{org}^m$, denoted as the $Q^m$, wherein the $$Q^m = \frac{Q_{SSIM,l}^m + Q_{SSIM,r}^m}{2}.$$

6. The method for assessing the objective quality of the stereoscopic video based on the reduced time-domain weighting, as recited in claim 2, wherein, in the step ⑨, calculating the quality $Q^m$ of the $F_{dis}^m$ relative to the $F_{org}^m$ comprises steps of:
- ⑨-1), denoting the left viewpoint image and the right viewpoint image of the $F_{dis}^m$ respectively as the $F_{dis,l}^m$ and the $F_{dis,r}^m$;
- ⑨-2), obtaining respective qualities of the $F_{dis,l}^m$ and the $F_{dis,r}^m$ through a structural similarity image quality assessment method, respectively denoted as $Q_{SSIM,l}^m$ and $Q_{SSIM,r}^m$; and
- ⑨-3), calculating the quality of the $F_{dis}^m$ relative to the $F_{org}^m$, denoted as the $Q^m$, wherein the $$Q^m = \frac{Q_{SSIM,l}^m + Q_{SSIM,r}^m}{2}.$$

7. The method for assessing the objective quality of the stereoscopic video based on the reduced time-domain weighting, as recited in claim 1, wherein, in the step ⑨, calculating the quality $Q^m$ of the $F_{dis}^m$ relative to the $F_{org}^m$ comprises steps of: obtaining the quality of the $F_{dis}^m$ relative to the $F_{org}^m$ through an objective assessment method of a reduced reference stereoscopic image quality based on a human visual perception, and denoting the quality of the $F_{dis}^m$ relative to the $F_{org}^m$ as the $Q^m$.

8. The method for assessing the objective quality of the stereoscopic video based on the reduced time-domain weighting, as recited in claim 2, wherein, in the step ⑨, calculating the quality $Q^m$ of the $F_{dis}^m$ relative to the $F_{org}^m$ comprises steps of: obtaining the quality of the $F_{dis}^m$ relative to the $F_o^n$; through an objective assessment method of a reduced reference stereoscopic image quality based on a human visual perception, and denoting the quality of the $F_{dis}^m$ relative to the $F_{org}^m$ as the $Q^m$.

\* \* \* \* \*